May 4, 1954  F. F. DAUENHAUER  2,677,378
METHOD AND APPARATUS FOR PICKING HOPS
Filed Aug. 16, 1950  6 Sheets-Sheet 1
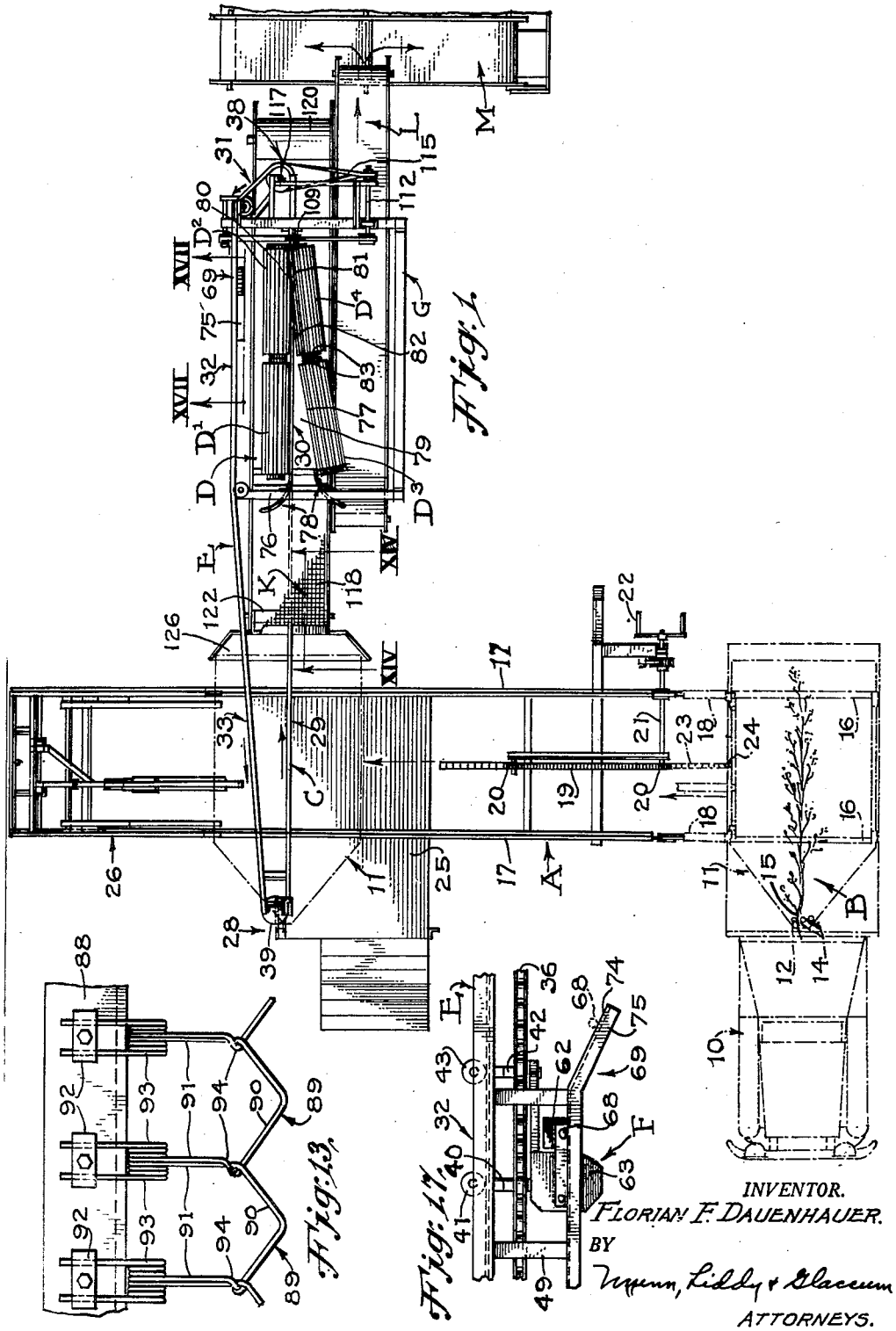
INVENTOR.
FLORIAN F. DAUENHAUER.
BY
Munn, Liddy & Glaccum
ATTORNEYS.

May 4, 1954
F. F. DAUENHAUER
2,677,378
METHOD AND APPARATUS FOR PICKING HOPS
Filed Aug. 16, 1950
6 Sheets-Sheet 2
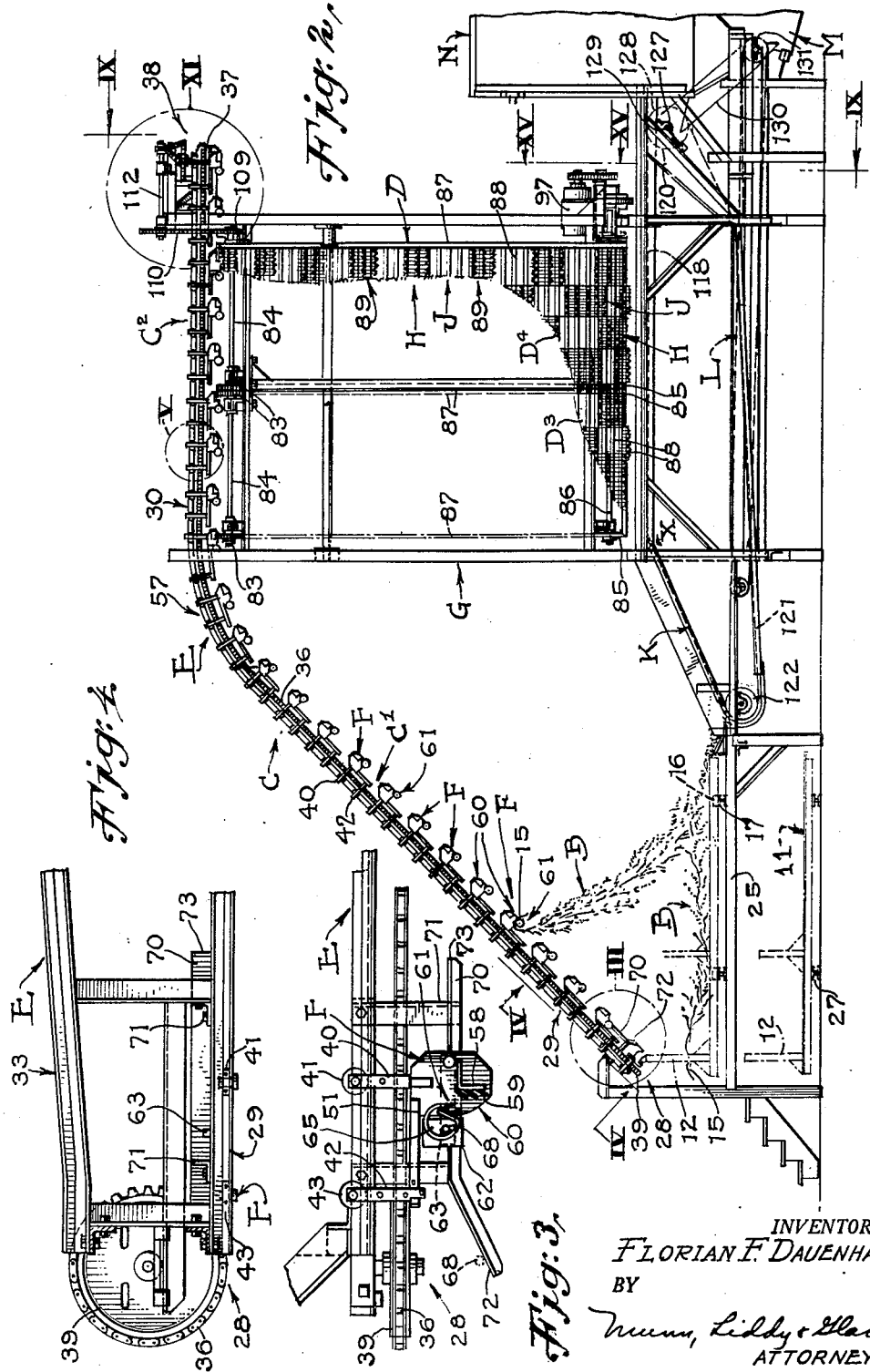
INVENTOR.
FLORIAN F. DAUENHAUER
BY
Munn, Liddy & Glaccum
ATTORNEYS

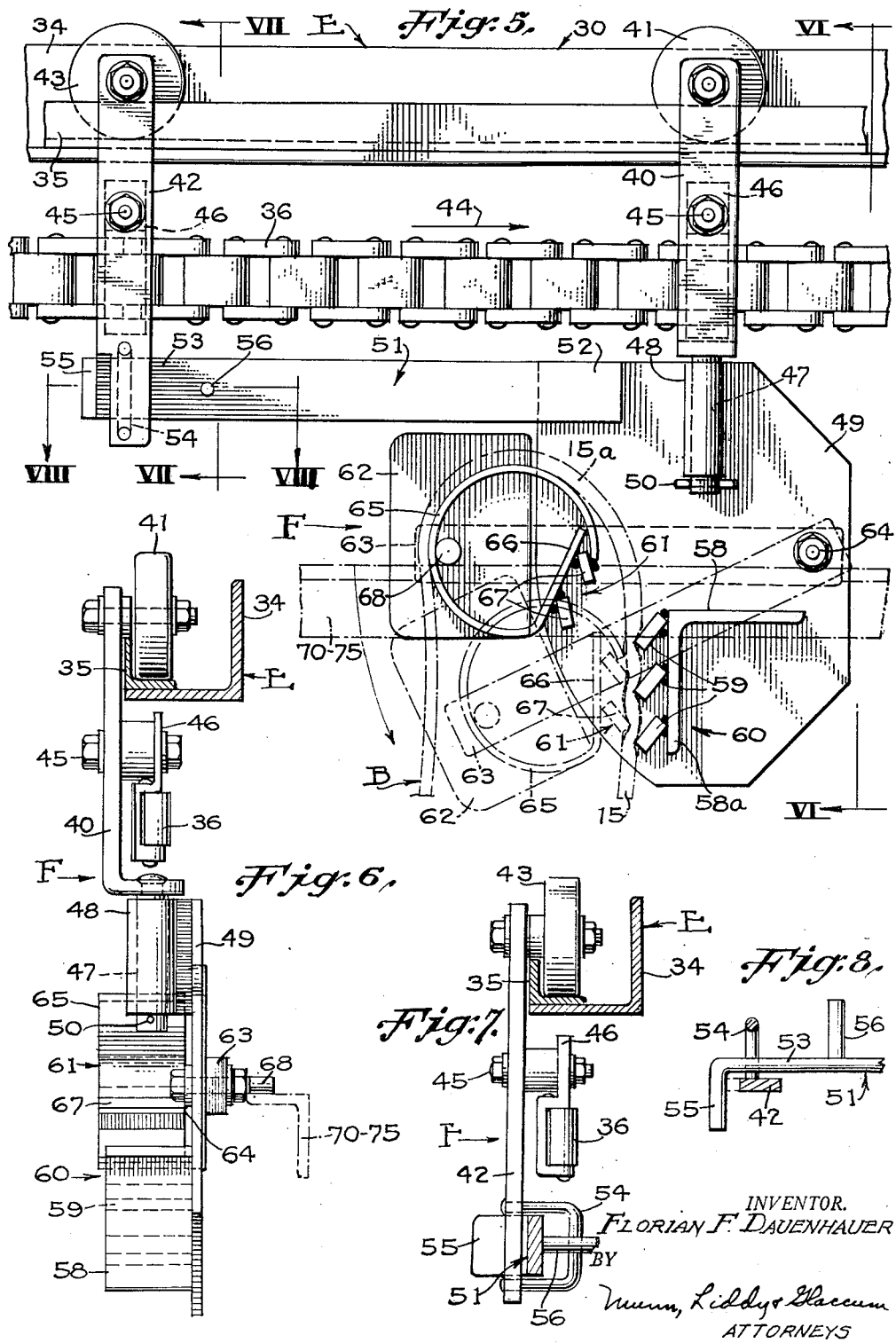

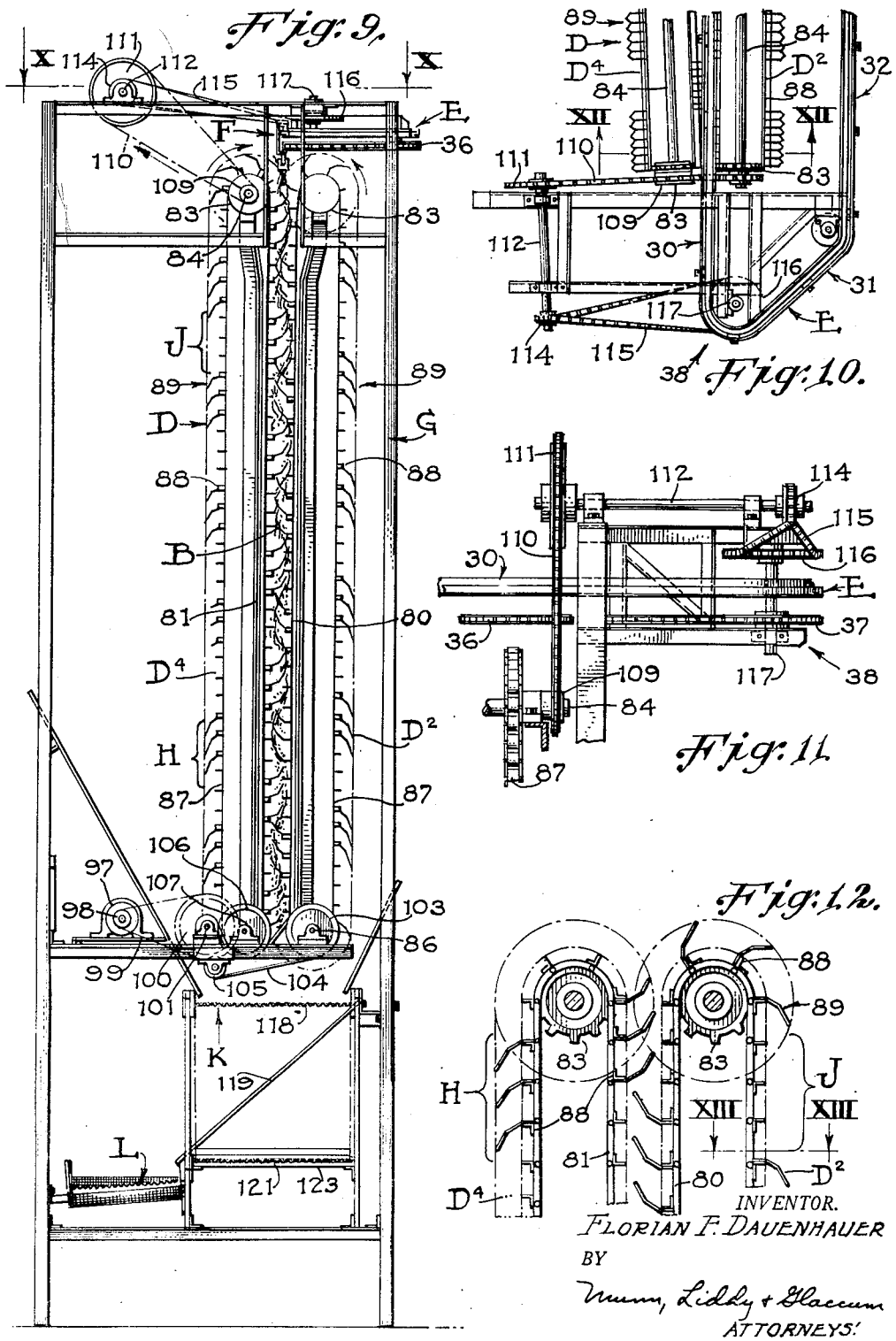

May 4, 1954  F. F. DAUENHAUER  2,677,378
METHOD AND APPARATUS FOR PICKING HOPS
Filed Aug. 16, 1950  6 Sheets-Sheet 5

INVENTOR.
FLORIAN F. DAUENHAUER
BY
Munn, Liddy & Daccum
ATTORNEYS.

May 4, 1954     F. F. DAUENHAUER     2,677,378
METHOD AND APPARATUS FOR PICKING HOPS
Filed Aug. 16, 1950     6 Sheets-Sheet 6

INVENTOR.
FLORIAN F. DAUENHAUER
BY
*Munn, Liddy & Glaccum*
ATTORNEYS

Patented May 4, 1954

2,677,378

UNITED STATES PATENT OFFICE 2,677,378

METHOD AND APPARATUS FOR PICKING HOPS

Florian F. Dauenhauer, Santa Rosa, Calif.

Application August 16, 1950, Serial No. 179,722

10 Claims. (Cl. 130—30)

The present invention relates to improvements in a method and apparatus for picking hops. It embodies improvements over the stationary type hop-picking machine disclosed in my United States patent, Reissue No. 22,889, dated June 17, 1947.

An object of this invention is to provide an improved method of picking hops from vines, assuring a thorough removal of the hops, without damaging the hops. More specifically stated, the vines are formed into wave-like configurations, defining alternate crests and valleys extending lengthwise of the vines.

The waves thus formed are advanced lengthwise of the vines to continually replace crests by valleys and vice versa, thereby undulating the vines in first one direction and then the other for causing pendulum-like movements and exposure of the hops by the continual weaving of the vines. The hops are removed during the undulating of the vines.

Moreover, the method employs the progressive increasing of the amplitudes of the waves as the hops are picked. Also, crests and valleys of the waves are interchanged abruptly as the picking of the hops continue, and the branches of the vines are spread out laterally to expose hops and preclude the vines from matting.

As a further object of the invention, I provide an apparatus for carrying out the foregoing method in a continuous process.

Another object of this invention is to provide an apparatus in which the butt ends of the vines are anchored to an endless carrier. As these vines are advanced through the machine, the vines are suspended from overhead. Picking units are arranged to undulate and spread the suspended vines, producing the continual reversing of the waves during the hop-picking operation.

Moreover, the vines are anchored to the endless carrier at a convenient working height for the operator; and as the carrier advances, the vines are elevated to the height necessary to allow them to depend freely from the carrier. This arrangement produces an apparatus that occupies far less horizontal space than the machine shown in my Reissue Patent No. 22,889, above identified.

Another object is to provide a hop-picking unit adapted to commence removing hops as soon as the vines enter the unit. As the vines are advanced farther into the unit, the amplitudes of the waves formed in the vines are progressively increased, exposing more hops for removal.

Other objects and advantages will appear as the specification continues, and the novel features of the invention will be set forth in the claims hereunto appended.

*Drawings*

For a better understanding of this invention, reference should be had to the accompanying drawings, in which:

Figure 1 is a top plan view of my improved hop-picking apparatus, and diagrammatically illustrates the incoming hop vines being transferred from a vehicle to the picking apparatus;

Figure 2 is a side elevational view of Figure 1;

Figure 3 is an enlarged view of that portion of the vine-feed end of the apparatus included within the circle III of Figure 2;

Figure 4 is a fragmentary plan view at the feed end of the apparatus, as seen from the plane IV—IV of Figure 2;

Figure 5 is an enlarged side view of a vine-grasping and feeding unit, as enclosed by the circle V in Figure 2;

Figures 6 and 7 are vertical transverse sectional views taken along the lines VI—VI and VII—VII, respectively, of Figure 5;

Figure 8 is a longitudinal sectional view taken along the line VIII—VIII of Figure 5;

Figure 9 is a transverse sectional view as seen from the plane IX—IX of Figure 2;

Figure 10 is a fragmentary top plan view at the delivery end of the apparatus, as indicated by the line X—X of Figure 9;

Figure 11 is an enlarged view of the portion of the driving mechanism enclosed by the circle XI in Figure 2, the vine-grasping and feeding units being omitted;

Figure 12 is a vertical transverse sectional view at the delivery end of the apparatus, and taken along the line XII—XII of Figure 10;

Figure 13 is a fragmentary plan view illustrating the hop-picking fingers secured to an angle bar of the picking unit, as seen from the plane XIII—XIII in Figure 12;

Figure 17 is a vertical longitudinal sectional view taken at the vine-releasing station, as indicated by the line XVII—XVII in Figure 1;

Figure 16:
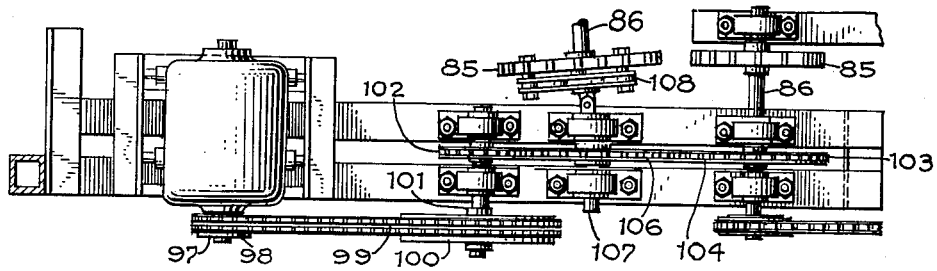
Figure 16 is a top plan view of Figure 15, as suggested by the plane XVI—XVI in the latter.

While I have shown only the preferred form of my invention, it should be understood that various changes, or modifications, may be made within the scope of the appended claims without departing from the spirit thereof.

*Detailed description of hop vine-transferring mechanism*

Referring to Figure 1, I disclose a hop vine-transferring mechanism indicated generally at A, which forms the subject matter of my copending application on a Hop-transporting Mechanism, Ser. No. 179,721, filed in the United States Patent Office on August 16, 1950. Accordingly, this mechanism has been shown somewhat schematically in the present case.

As shown, a vehicle 10 has a carriage 11 demountably mounted thereon for the purpose of transporting hop vines B from the field. Uprights 12 project above this carriage to define slots 14 therebetween into which the butt ends 15 of the hop vines are inserted. After the carriage has been loaded with vines, the vehicle is driven into a position where rails 16 on the underneath side of the carriage are in registration with upper feed tracks 17 forming part of the transferring mechanism A.

Upper bridging members 18 are employed between the rails 16 and the tracks 17 to serve as supports for the carriage 11 when the latter is pulled from the vehicle body. Transfer of the carriage 11 to the tracks 17 is accomplished by an endless chain 19, which is trained around sprockets 20. Rotary motion is imparted to one of these sprockets by a shaft 21 and a crank 22. A pull chain 23 has one end thereof anchored to the chain 19, while its free end is engaged with a hook 24 on the carriage.

Thus the carriages 11 with their loads of vines are moved one at a time onto the upper feed tracks 17. The carriages are slid over these tracks onto a working platform 25. An operator standing on this platform transfers the hop vines B to an endless vine-carrier designated generally at C, forming part of the present invention.

After the vines are removed from each carriage 11, the latter is transferred by a switch 26 (see Figure 1) to a lower return track 27 (see Figure 2), from which it is reloaded again on the vehicle 10. The foregoing mentioned copending application discloses the details of the switch 26 and the mechanism for reloading the empty carriages on the vehicle.

*Vine-carrier*

It will be noted from Figure 2 that the feed end 28 of the vine-carrier C is arranged near the platform 25 so as to facilitate the work of the operator in attaching the hop vines onto this carrier. However, this carrier has an inclined section C1 that travels along a rather steep grade, as shown in Figure 2, so as to bring the butt ends 15 of the vines to a horizontal upper level section C2 of the carrier.

At this point, I shall mention the fact that the hop vines B are suspended from their butt ends, and pass through a hop-picking unit D, as the vines are advanced by the upper section C2 of the carrier. This unit will be described in detail as the specification continues.

The vine-carrier C is guided for movement along a substantially endless supporting rail indicated generally at E. This rail has an ascending section 29, which starts at the feed end 28 of the vine-carrier and leads to an upper horizontal section 30 (see Figures 1, 2, 4, 10 and 11). As shown in Figures 1 and 10, the rail section 30 is connected by a curved end portion 31 to a rear horizontal rail section 32. The latter connects to a descending rail section 33 leading back to the feed end 28 of the vine-carrier.

In actual practice, the supporting rail E is fashioned from an angle iron 34 having a smaller angle iron 35 secured thereto, producing a fabricated rail having a channel-shaped cross-section (see Figures 5–7, inclusive).

An endless conveyor chain 36 is mounted immediately below the rail E and follows the same path as the latter. This chain is trained over a drive sprocket 37 disposed at the upper rear end 38 of the endless vine-carrier C (see Figures 2 and 11). The lower end of the chain 36 passes around a tail or reversing sprocket 39 arranged at the feed end 28 of the vine-carrier (see Figures 1–4, inclusive).

Referring to Figures 2–7, inclusive, 9 and 17, I provide a plurality of vine-grasping and feeding units designated generally at F, which form part of the endless vine-carrier C previously mentioned. The units F are identical with one another. As disclosed in Figures 5 and 6, the vine-grasping and feeding unit F includes a main hanger 40 having a wheel 41 at its top, which rides along the smaller angle iron 35 of the supporting rail E. A guide hanger 42 is provided with a wheel 43 at the upper end thereof, which rides over the angle iron 35 as the unit F is advanced in the direction of the arrow 44 in Figure 5.

The hangers 40 and 42 are attached by bolts 45 to lugs 46 that are fixed to and project from the chain 36. Also, these lugs prevent the wheels 41 and 43 from jumping the angle bar 35.

As shown in Figures 5 and 6, the main hanger 40 has a journal rod 47 that telescopes through a tubular boss 48 fixed to a plate 49. A pin 50 is anchored to the lower end of the rod 47 to retain the boss 48 on this rod. Thus the plate 49 is supported by the hanger 40 with freedom of swinging movement therebetween.

It will be noted that a bar 51 has its end 52 fixed to the plate 49, while the free end 53 of this bar projects loosely through a U-shaped bracket 54 anchored to the lower end of the guide hanger 42. An angular end 55 on the bar 51 and a transverse pin 56 on the latter limit longitudinal movement of the hanger 42 relative to the length of this bar.

As the chain 36 passes around a portion of a circle, such as the sprockets 37 or 39, the plate 49 is permitted to swing on its journal rod 47. Likewise, the guide hanger 42 can move lengthwise relative to the bar 51. This will allow the vine-grasping and feeding unit F to negotiate a curve during its travel along the supporting rail E. Moreover, the unit can pass along the arced portion 57 disposed between the ascending and front horizontal rail sections 29 and 30, respectively, or along a corresponding arced portion between the rear horizontal and descending rail sections 32 and 33, respectively, all without binding action.

In Figures 5 and 6, I show an angle bar 58 fixed to the plate 49 so as to project therefrom. A series of inclined teeth 59 are welded or otherwise secured to this angle bar and also to the plate 49. The angle bar 58 and teeth 59 define a stationary vine-grasping jaw designated generally at 60.

As clearly shown in Figure 5, a movable jaw 61 coacts with the fixed jaw 60 to grip the butt end 15 of the hop vine B therebetween when the jaw 61 is lowered and occupies the dot-dash line position disclosed in this view. In its structural details, this movable jaw includes a plate 62, which is fixed to one end of a lever 63. The opposite end of this lever is swingably mounted by a bolt 64 to the plate 49.

In turn, the plate 62 has a curved saddle 65 fixed thereto over which the butt end of the hop vine is adapted to be draped, forming this end of the vine into a curved portion 15a (see Figure 5). This saddle has a straight extension 66 to which inclined teeth 67 of the movable jaw are welded.

It will be observed from Figure 5 that upon swinging the plate 62 and its teeth 67 into the lowered or dot-dash line position in this view, the extension 66 will parallel the vertical leg 58a of the angle bar 58. At this time, the butt end 15 of the hop vine will be firmly gripped from opposite sides by the teeth 59 and 67 of the two jaws. However, upon raising the plate 62 into the full-line position in Figure 5 (also see Figures 3 and 17), the vine will be released.

The weight of the hop vine B is sufficient to pull the plate 62 downwardly until its teeth 67 engage with the butt end 15 of the vine, it being noted that the curved end 15a of the vine is disposed over the saddle 65. The plate 62 and lever 63 have a pin 68 projecting therefrom, which is adapted to raise the movable jaw 61 when a new hop vine B is to be placed between the jaws 60—61 at the feed end 28 of the endless vine-carrier, or the remaining stalk of the vine is to be removed at the vine-release station 69 (see Figures 1 and 17).

Turning now to Figures 2, 3, 5 and 6, it will be seen that a fixed cam track 70 is suspended from the rail E by brackets 71 at the feed end 28 of the endless vine-carrier. This track has an inclined end 72 over which the pin 68 rides as the vine-grasping and feeding unit F passes through the feed end.

As illustrated in Figure 3, the pin 68 has moved up the incline of the cam track 70 and raised the movable jaw 61 clear of the stationary jaw 60. At this time, the operator inserts the butt end 15 of a new hop vine B over the saddle 65, with this butt end presented between the jaws 60—61. As soon as the pin 68 rides off the end 73 of the track (see Figure 3), the jaw 61 will move downwardly, thus gripping the vine between the two jaws. Figure 2 shows the butt end 15 of a hop vine B as being anchored to one of the units F, and being raised along the ascending section 29 of the supporting rail E for entry into the hop-picking unit D.

After passing through the unit D, the vine-grasping and feeding units F bring the stripped hop stems to the vine-release station 69 (see Figures 1 and 17. As each unit F enters this station, the projecting pin 68 rides up an inclined end 74 of a fixed cam track 75. Thus the plate 62 and lever 63 are raised to free the jaws from their grip on the butt end of the remaining hop vine.

*Hop-picking unit*

Figure 18:
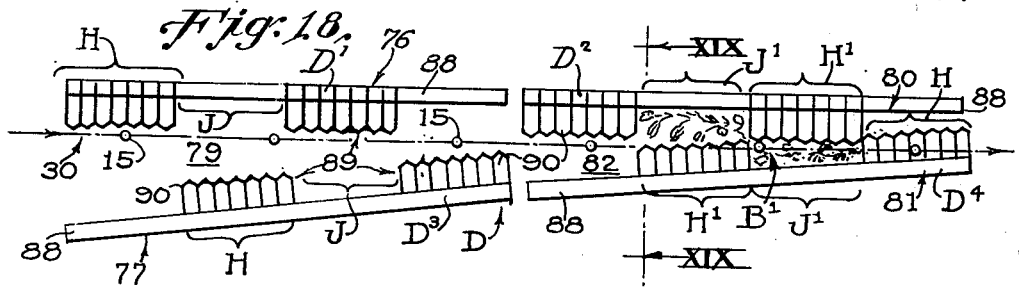
Figure 18 is a diagrammatic plan view illustrating the confronting reaches of the hop-picking unit, and disclosing hop vines being advanced therebetween.

Broadly speaking, the hop-picking unit D includes four vertically-arranged picking conveyors D1 to D4, inclusive. These conveyors are identical with one another. As shown in Figures 1 and 18, the picking conveyors D1 and D2 are disposed on one side of the front horizontal rail section 30, while the picking conveyors D3 and D4 are arranged on the opposite side thereof.

The depending hop vines B that are advanced by the endless vine-carrier C initially pass between the confronting reaches 76 and 77 of the picking conveyors D1 and D3, which are arranged in horizontal angular relation relative to each other. Curved plates 78 (see Figure 1) guide the hop vines into the converging throat 79 defined between the reaches 76 and 77 (also see Figure 18). Likewise, the confronting reaches 80 and 81 of the picking conveyors D2 and D4 converge toward each other to define a gradually-diminishing throat 82 through which the depending hop vines must pass.

It will be noted from Figures 1 and 18 that the horizontal rail section 30 is arranged close to and parallel with the conveyor reaches 76 and 80. However, the reaches 77 and 81 are spaced from the rail section 30 in angular relation therewith. The angularity and spacing of the reach 81 with respect to the rail section 30 is somewhat less than is the case with the reach 77.

The picking conveyors D1 to D4, inclusive, are supported by a framework designated at G in Figures 1, 2 and 9. In their structural features, each of these conveyors include a pair of upper sprockets 83, which are mounted on horizontal shafts 84. Moreover, a pair of lower sprockets 85 are mounted on shafts 86 at the bottoms of each of these picker conveyors (see Figures 2 and 16). Endless chains 87 are trained around the upper and lower sprockets 83 and 85, respectively (see Figures 2, 9, 19 and 20).

Finger-carrying bars 88 are provided for each picking conveyor, and extend horizontally between the endless chains 87 thereof. The bars are secured to these chains so as to be advanced by the latter when rotary motion is imparted to the lower shaft 86 in the manner to be set forth later.

Reference is made to Figure 13, wherein the construction of picking fingers 89 is disclosed. Each finger includes a V-shaped outer end 90 having parallel shanks 91 extending therefrom. These shanks are anchored by clips 92 to the bars 88. Coils 93 are fashioned in the shanks of the fingers adjacent to the bars 88. In order to resist lateral strain on the picking fingers, the adjacent shanks are twisted together, as indicated at 94.

Figures 19, 20:
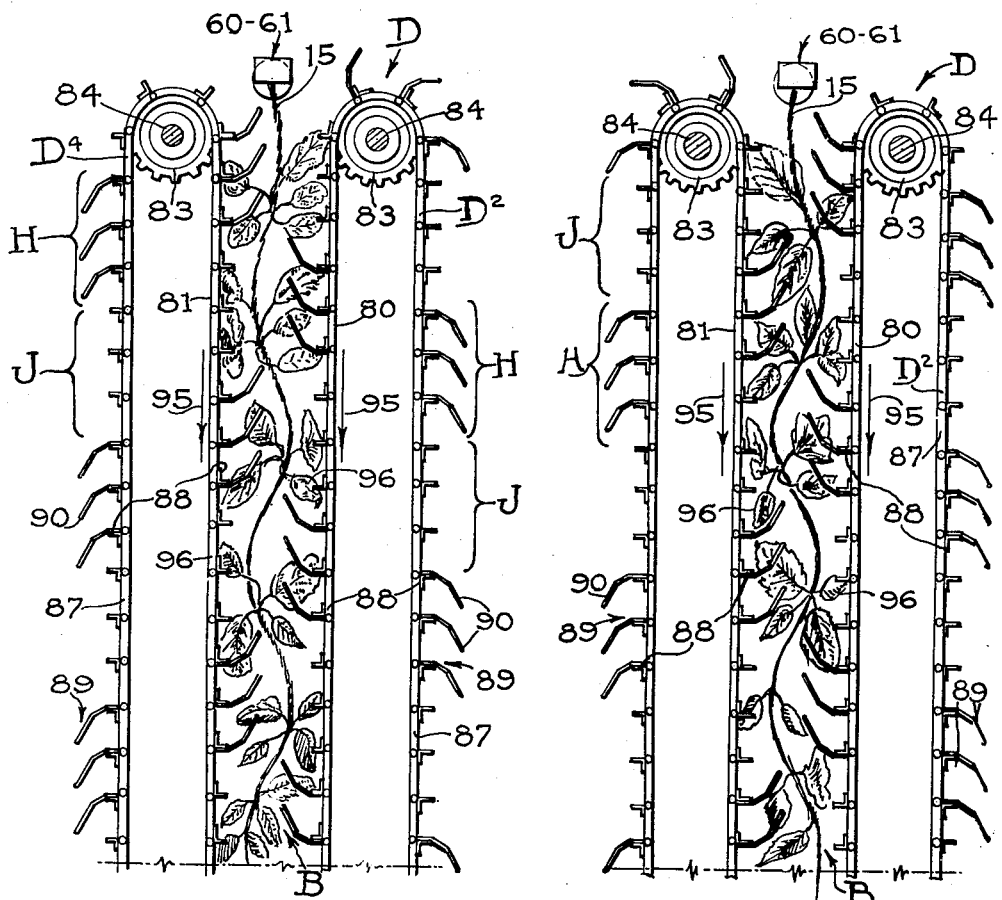
Figure 19 is a vertical transverse sectional view taken along the line XIX—XIX of Figure 18, illustrating a hop vine formed into a wave-like configuration by the active fingers on the confronting reaches of the hop-picking units.
Figure 20 is a view similar to Figure 19, but showing the picking fingers advanced to reverse the wave defined by the undulating vine.

As the confronting reaches 76—77 and 80—81 are moved downwardly, as suggested by the arrows 95 in Figures 19 and 20, hops 96 are stripped from the vines B by the V-shaped ends 90 of the picking fingers.

Particular attention is called to the fact that the fingers 89 are arranged in a checker-board formation on the bars 88, as will clearly appear by reference to Figure 2. The rectangular groups H of picking fingers alternate with similarly-shaped spaces J on the checker-board design.

Contacting corners of the rectangular groups of fingers are arranged on the diagonal.

As shown in Figure 18, the groups of fingers H on the conveyor reach 76 are disposed opposite to the spaces J of the conveyor reach 77. In the same manner, the finger groups H on the reach 80 are arranged opposite to the spaces J of the reach 81. Actually the finger groups H on the confronting reaches toward the right-hand end of Figure 18 overlap one another (also see Figure 12).

Figure 19 clearly discloses the fact that the hop vine B will be formed into a wave-like configuration by the picking fingers on the confronting reaches of the conveyors. These waves define alternate crests and valleys extending along the length of the vine. Inasmuch as the butt end 15 of the vine is anchored between the overhead jaws 60—61, the waves will be advanced lengthwise of the vine, continually replacing crests by valleys and vice versa. Accordingly, the vine will be undulated in first one direction and then the other, causing pendulum-like movements of the hops 96. This will swing and expose the hops for removal by the descending picking fingers.

During the undulating of the hop vines, the latter are advanced to the right in Figures 1 and 18 by the vine carrier C. Since the throats 79 and 82 converge toward the right in Figure 18, the amplitudes of the waves will be progressively increased, causing greater undulating of the vines. Moreover, as the vine is moved along the rail section 30 in Figure 18, from one group H of fingers to the next group, the crests must be converted abruptly into valleys, and vice versa, at regular intervals.

It will be noted further that the hop vines are advanced along the rail section 30 in close proximity relative to the picking fingers on the conveyor reaches 76 and 80. This will insure immediate picking of hops along one side of the suspended vines. The reaches 77 and 81 in Figure 18 define a double taper, in which the picking fingers are gradually brought into picking operation as the hop vine is advanced toward the right in this view.

As the space in the throats 79 and 82 narrows, pendulum-like movements are imparted to the hops 96 from both sides. This will result in better picking, because the hops will swing into the V-shaped ends 90 of the fingers. If the vines were not undulated back and forth, the tendency of the fingers would be to strip petals from one side of the hops. Such action would be undesirable, since the full hop is wanted—not broken ones.

Turning now to the right-hand portion of Figure 18, I have shown a hop vine B1 by way of special illustration. This vine has its branches spread out laterally by the groups H1 of fingers into the spaces J1. This separating action on the hop vine is due to the groups of fingers on one side of the vine being followed by the groups of fingers on the opposite side.

As the hop vine B1 moves between two horizontally-spaced groups of fingers, the horizontal wave set up in the vine is brought to a stop or dampened. Then in moving into the next vertical rows of opposed groups of alternating fingers the vine is separated longitudinally. This aids the flattening effect and obviates any tendency of the vine to mat or merely be compressed. As the vine continues to move to the right, a wave motion opposite to the previous wave motion is set up.

Drive mechanism

Next I shall describe the mechanism for driving the vine carrier C and the hop-picking unit D. In this connection, reference is made to Figures 1, 2, 9, 10 and 11 for details.

Power is derived from a motor 97 having a drive pulley 98 thereon. The latter is connected through a belt 99, or the like, so as to rotate a driven pulley 100 in a counter-clockwise direction in Figure 15. The pulley 100 is secured to a shaft 101 on which a drive sprocket 102 is fixed. This sprocket operates a driven sprocket 103 on the shaft 86 of the conveyors D1 and D2 by means of a chain 104. The latter passes around an idler sprocket 105, with the upper reach of this chain being trained under a lower section of a driven sprocket 106 fixed to a stub shaft 107.

Figure 15:
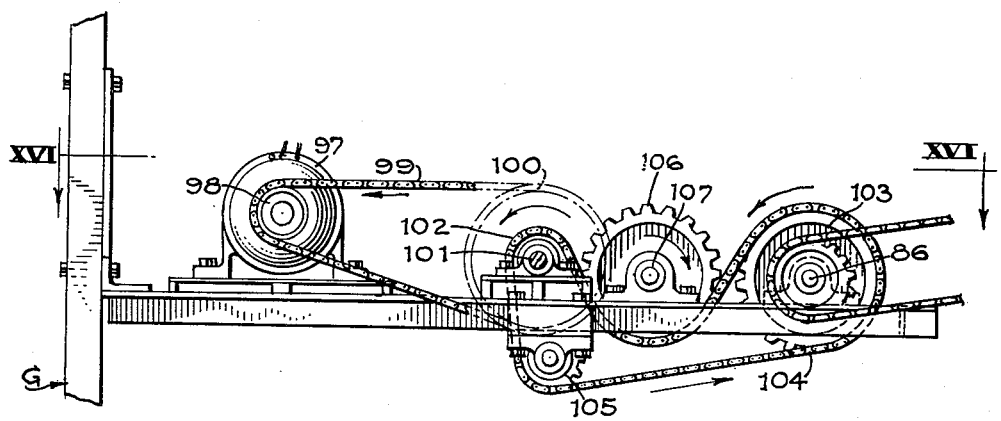
Figure 15 is an end elevational view of the drive mechanism for operating the picking unit, as observed from the line XV—XV of Figure 2.

Figure 16 illustrates the shaft 107 as being connected by a flexible coupling 108 to one of the sprockets 85 on a lower shaft 86. It will be observed that the latter extends at an angle corresponding with the angularity of the picking conveyor D4 in Figure 18. In Figure 15, I show the chain 104 turning the sprocket 103 in a counter-clockwise direction, while the sprocket 106 rotates clockwise. This will move the reaches 76—77 and 80—81 of the picking conveyors downwardly in the directions of the arrows 95 in Figures 19 and 20 during operation of the machine.

The shaft 84 of the picking conveyor D4 is utilized for driving the endless vine-carrier C. In Figures 9 to 11, inclusive, this shaft has a drive sprocket 109 fastened thereto. This sprocket is connected by a chain 110 to a driven sprocket 111 fixed to a shaft 112. It will be seen from Figure 11 that the shaft 112 carries a sprocket 114 that is connected by a chain 115 to a sprocket 116 mounted on a vertical shaft 117. On the latter shaft is fastened the main drive sprocket 37 around which the chain 36 of the vine-carrier C is trained. This completes the drive to the vine-carrier.

Hop-receiving conveyors

The hops 96 picked from the vines fall directly upon an upper reach 118 of a discharge screen conveyor K, which extends lengthwise of the machine beneath the hop-picking unit D (see Figures 1, 2, 9 and 14). Individual hops will pass through the mesh of the screen, falling onto an inclined chute 119. The latter will deflect these hops into a discharge conveyor L.

It may be pointed out at this time that small branches torn from the hop vines and leaves will pass through the reach 118, and will gravitate from the chute 119 into the conveyor L. This material, along with the individual hops, are discharged into a separating conveyor designated generally at M in Figures 1 and 2.

Clusters of hops and larger branches, which fail to pass through the mesh of the screen of the conveyor K are carried forward by the upper reach 118, and are discharged over a drum 120 into a trommel N (see Figure 2). The details of the separating conveyors M are shown in my copending application on an Apparatus for Separating Picked Hops from Leaves and Stems, Ser. No. 179,723, filed August 16, 1950.

Figure 14:
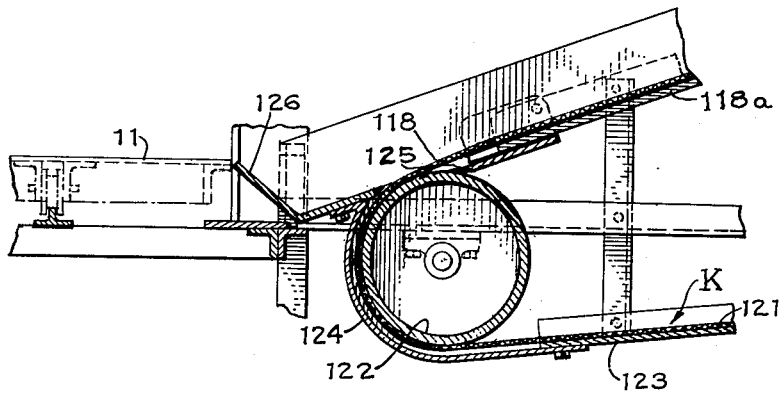
Figure 14 is a vertical longitudinal sectional view taken along the line XIV—XIV of Figure 1, showing a portion of a screen for conveying branches and clusters of hops to a trommel.

Referring now to Figures 2 and 14, any clusters, branches or the like, hanging onto the mesh of the upper reach 118 of the screen conveyor K may have a tendency to be carried along the lower reach 121 of this conveyor. This material is pulled along by the reach 121 to a drum 122, and is retained against dropping downwardly by an apron 123 disposed beneath this reach. A curved shield 124 is spaced from the drum 122 to provide a space through which this returned material may move onto the upper reach 118.

As the returned material, such as clusters and branches, again enter upon the upper reach 118 in Fig. 14, a hinged lip 125 prevents the material from dropping downwardly due to the free end of the lip riding on the periphery of the drum. This material is carried by the upper reach 118 of the screen K over an upwardly inclined stationary apron 118a that extends to the point X in Fig. 2. At this point, the material on the upper reach 118 is free to fall onto the inclined chute 119, see Figure 9. An idler roller is placed at the point X where the upwardly inclined portion of the upper reach 118 is changed into a horizontal portion that extends throughout the length of the machine.

It will be noted that a trough 126 is arranged adjacent to the carriage 11 when the latter is disposed on the platform 25. Thus hops, clusters, broken pieces of vines, etc., may be swept off the carriage 11 by the operator directly into this trough. The reach 118 of the screen conveyor K will transfer such material to the trommel N for further separation.

Any suitable means may be provided for driving the conveyors K and L. For this purpose, I have shown the drum 120 being rotated by a sprocket 127, the latter being turned by a chain drive. As shown in Figure 2, the drum is mounted on a shaft 129, and the latter is connected by another chain drive 130 to the head drum 131 around which the screen L is trained.

Summary of operation

While the vehicle 10 is in the field, the cut hop vines B are placed on the carriage 11, which is demountably mounted on the body of the vehicle. Upon arrival of the hop-transferring mechanism A, the pull chain 23 is engaged with the hook 24 on the carriage, and the endless chain 19 is operated by turning the crank 22 to draw the carriage and its vines toward the platform 25. Several of these carriages may be accommodated by upper feed tracks 17 of the transferring mechanism at one time.

Assuming that the motor 97 is running, with the vine-carrier C being advanced upon the ascending section 29 of the supporting rail E, toward the hop-picking unit D, the vine-grasping and feeding units F will enter the feed end or station 28 of the machine one at a time. As each unit F travels through this feed station, the pin 68 will ride upwardly along the inclined end 72 of the track 70 (see Fig. 3). This will serve to lift the movable vine-gripping jaw 61 away from the stationary jaw 60.

Now the operator standing on the platform 25 takes one of the hop vines, and places the butt end 15 thereof over the curved saddle 65 as suggested in Figure 5. The butt end is introduced between the teeth 59 and 67, with the curved end 15a of the vine overlying the saddle. As soon as the pin 68 clears the end 73 of the cam track 70, the movable jaw will gravitate downwardly to grip the butt end of the vine between the two jaws; of course, the weight of the vine will exert a downward pull on the movable jaw.

As the unit F moves upwardly along the ascending rail section 29, the hop vine carried thereby will depend from the vine-carrier in the manner illustrated in Figure 2. This vine-grasping and feeding unit F will convey the hop vine B into the throat 79 defined between the downwardly-moving reaches 76 and 77 of the picking conveyors D1 and D3, respectively. At this time the fingers 89 on the reach 76 will become active in removing hops from one side of the vine. During advancement of the vine along the rail section 30, the fingers on the reach 77 will remove hops from the opposite side of the depending vine.

The endless-vine-carrier C will continue to advance the unit F to the right in Figure 18, and will move the hop vine through the gradually-diminishing throat 82 provided between the reaches 80 and 81 of the picking conveyors D2 and D4, respectively. The fingers on these reaches will pick hops from both sides of the laterally-advancing vine.

Referring to Figures 19 and 20, it will be observed that the hop vine is formed into a wave-like configuration, with the waves being moved lengthwise of the vine toward the lower end of the latter. The crests and valleys of these waves are interchanged continually, with the amplitudes of the waves increasing as the vine is moved to the right in Figure 18. This will impart pendulum-like movements of the hops 96, swinging them into the paths of the descending picking fingers. Also, the branches of the vine will be spread out laterally, as suggested by the vine B1 in Figure 18, further exposing the hops for picking, and preventing the vine from being compressed into a mat.

The hops, clusters, leaves and branches stripped from the vine will fall downwardly to the upper reach 118 of the screen conveyor K (see Figures 2 and 9). Individual hops and smaller material will gravitate through the mesh of this reach, and will be deflected by the inclined chute 119 onto the discharge conveyor L. These hops and material are advanced to the separating conveyor M. The clusters, larger leaves and branches will be advanced by the screen conveyor K and discharged into the trommel N for further hop-picking operation.

I claim:

1. In the herein described method of picking hops from a vine, the steps of: forming the vine into a configuration having longitudinal waves, which define alternate crests and valleys extending along the length of the vine; advancing these longitudinal waves lengthwise of the vine to continually replace crests by valleys and vice versa, thereby undulating the vine in first one direction and then the other for causing pendulum-like movements of the hops and expose them for picking operations; simultaneously with the foregoing steps forming the branches extending laterally from the main part of the vine into configurations having waves extending lengthwise thereof which provide alternate crests and valleys extending crosswise relative to the general length of the vine, while at the same time advancing these branch waves laterally to undulate the branches of the vine crosswise; the longitudinal and branch waves crossing one another, thereby causing the vine to spread to expose hops and prevent it from matting by reversal of the amplitudes at the intersections of these crossing waves; and picking the hops from the vine during the longitudinal and crosswise undulatings and spreading of the vine.

2. The combination of steps as defined in claim 1, in which the amplitudes of both the longitudinal and branch waves are progressively increased as the mass of the vine is reduced, thereby swinging other hops into position for picking operations.

3. The combination of steps as defined in claim 1, in which the crests of the branch waves are abruptly converted into valleys and vice versa to impart sudden spreading action to the vine and swinging of hops at the points of intersections of the longitudinal and branch waves.

4. In the herein described method of picking hops from a vine, the steps of: suspending the vine from one end thereof; imparting successive wave-like configurations to the vine, extending vertically throughout the entire length of the suspended vine; these vertical waves defining alternate crests and valleys; advancing these vertical waves downwardly of the vine, continually replacing crests by valleys and vice versa, thereby undulating the vine in first one direction and then the other for causing pendulum-like movement of the hops and expose them for picking operations; simultaneously with the foregoing steps forming the branches extending laterally from the main part of the suspended vine into configurations having horizontal waves, which provide alternate crests and valleys extending crosswise relative to the general length of the vine, while at the same time advancing the horizontal waves laterally to undulate the branches of the vines crosswise; the vertical and horizontal waves crossing one another, thereby causing the vine to spread to expose hops and prevent it from matting by reversal of the amplitudes of these crossing waves; and picking the hops from the vine during the vertical and horizontal undulatings and spreading of the vine.

5. The combination of steps as defined in claim 4, in which the amplitudes of both the vertical and horizontal waves are progressively increased as the mass of the vine is reduced, thereby swinging other hops more violently into positions for picking operations.

6. In a hop-picking apparatus: picking conveyors having upright reaches mounted in confronting relation with one another; means for moving these reaches in a downward direction; means for advancing a hop vine horizontally in a lateral direction between these reaches, with the vine depending therebetween; and hop-picking fingers carried by the conveyors to strip hops from opposite sides of the vine; the fingers on each conveyor being mounted thereon in groups, with spaces provided between adjacent groups on each conveyor; each group having a plurality of fingers arranged in each of a plurality of rows; each group being spaced horizontally and vertically from adjacent groups in the same reach by a distance equal to the dimension of the group and being arranged opposite the space between horizontally and vertically spaced groups on the other reach.

7. In a hop-picking apparatus: picking conveyors having reaches mounted in confronting relation with one another; means for moving these reaches for hop-picking operations; means for advancing a hop vine laterally between these reaches, with the vine extending therebetween; and hop-picking fingers carried by the conveyors to strip hops from opposite sides of the vines; the fingers on each conveyor being arranged in groups, with spaces provided between adjacent groups on each conveyor; each group having a plurality of fingers arranged in each of a plurality of rows; each group being spaced in directions extending at substantially right angles to one another by a distance equal to the dimension of the group and being arranged opposite the space between groups on the other reach.

8. In a hop-picking apparatus, means for advancing vertically suspended hop vines in a horizontal predetermined path, hop picking fingers disposed on opposite sides of said path and projecting into the path of the vine so as to engage a vine being advanced along said path, said hop-picking fingers being mounted on movable elements and being movable in a direction normal to said path and longitudinally of the vine by said elements so as to strip hops from vines engaged thereby, said fingers being mounted on said elements in groups, each group being a plurality of fingers arranged in each of a plurality of rows, each group being spaced horizontally and vertically from adjacent groups on the same side by a distance equal to the dimension of the group and being arranged opposite the space between the horizontally and vertically spaced groups on the opposite side of the path.

9. In a hop-picking apparatus, means for advancing vertically suspended hop vines in a horizontal predetermined path, hop picking fingers disposed on opposite sides of said path and projecting into the path of the vine so as to engage a vine being advanced along said path, said hop-picking fingers being mounted on movable elements and being movable in a direction normal to said path and longitudinally of the vine by said elements so as to strip hops from vines engaged thereby, said fingers being mounted on said elements in groups of substantially equal extent along transverse axes, each group having a plurality of fingers arranged in each of a plurality of rows, each group being spaced horizontally and vertically from adjacent groups on the same side by a distance equal to the dimension of the group and being arranged opposite the space between the horizontally and vertically spaced groups on the opposite side of the path.

10. In a hop-picking apparatus, means for advancing suspended hop vines in a predetermined horizontal path, two opposing planes of picking elements, said path extending between said planes, said picking elements projecting into the path of the vines and being disposed so as to engage vines being advanced along said path, said elements being movable in a direction normal to said path and longitudinally of the vines so as to strip hops therefrom, said elements being mounted in groups forming a checkerboard-like arrangement on both of said planes, each group having a plurality of fingers arranged in each of a plurality of rows, each group being spaced horizontally and vertically from adjacent groups on the same plane by a distance equal to the dimension of the group and being arranged opposite the space between the horizontally and vertically spaced groups on the opposite plane.

References Cited in the file of this patent

UNITED STATES PATENTS

| Number | Name | Date |
|---|---|---|
| Re. 22,889 | Dauenhauer | June 17, 1947 |
| 1,008,914 | Horst | Nov. 14, 1911 |
| 2,193,354 | Thys | Mar. 12, 1940 |
| 2,222,767 | Gray | Nov. 26, 1940 |
| 2,496,858 | Crowley | Feb. 7, 1950 |
| 2,536,927 | Griswold | Jan. 2, 1951 |
| 2,570,844 | Oslund | Oct. 9, 1951 |